US012771007B2

(12) United States Patent
Elmasry et al.

(10) Patent No.: US 12,771,007 B2
(45) Date of Patent: Oct. 20, 2026

(54) HYBRID COUPLER WITH DIELECTRIC SUBSTRATE AND WAVEGUIDE TRANSITION

(71) Applicant: Lisa Dräxlmaier GmbH, Vilsbiburg (DE)

(72) Inventors: Rashad Elmasry, Altdorf (DE); Thomas Merk, Stuttgart (DE)

(73) Assignee: Lisa Dräxlmaier GmbH, Vilsbiburg (DE)

(*) Notice: Subject to any disclaimer, the term of this patent is extended or adjusted under 35 U.S.C. 154(b) by 160 days.

(21) Appl. No.: 18/597,560

(22) Filed: Mar. 6, 2024

(65) Prior Publication Data

US 2024/0304976 A1 Sep. 12, 2024

(30) Foreign Application Priority Data

Mar. 8, 2023 (GB) ...................................... 2303383

(51) Int. Cl.
*H01P 5/18* (2006.01)

(52) U.S. Cl.
CPC .................................... *H01P 5/184* (2013.01)

(58) Field of Classification Search
CPC .. H01P 3/08; H01P 5/10; H01P 11/003; H01P 5/22; H01P 1/213; H01P 3/003; H01P 3/081; H01P 5/1015; H01P 5/107; H01P 5/184; H01P 5/19; H01P 5/227; H01P 1/208; H01P 1/2135; H01P 1/2138; H01P 1/268; H01P 5/087; H01P 5/12; H01P 5/16; H01P 5/188; H01P 1/047; H01P 1/185; H01P 1/195; H01P 3/084; H01P 5/04;

(Continued)

(56) References Cited

U.S. PATENT DOCUMENTS 4,419,635 A * 12/1983 Reindel .................. H01P 5/225 333/120
5,412,354 A * 5/1995 Quan ........................ H01P 5/20 333/120

(Continued)

FOREIGN PATENT DOCUMENTS

EP 1209756 B1 11/2007
WO 2021076970 A1 4/2021

OTHER PUBLICATIONS

Search Report and IPO Letter issued in corresponding GB Application No. 23033830, issued Sep. 13, 2023, 4 pages.

*Primary Examiner* — John W Poos
(74) *Attorney, Agent, or Firm* — Burris Law, PLLC

(57) ABSTRACT

A hybrid coupler for transmitting equally splitted amplitude and quadrature phase electro-magnetic waves, the hybrid coupler includes a dielectric substrate having a first main surface and a second main surface opposing the first main surface and a stripline placed at the first main surface of the dielectric substrate. The stripline comprising an input port and two output ports. The stripline is formed to provide an equally splitted amplitude and quadrature phase electro-magnetic wave at the output ports based on an input signal received at the input port. The hybrid coupler further includes a rectangular waveguide transition attached to both of the main surfaces of the substrate. The waveguide transition is configured to transmit the equally splitted amplitude and quadrature phase electro-magnetic wave to an antenna.

13 Claims, 7 Drawing Sheets

(58) Field of Classification Search
CPC .. H01P 5/08; H01P 5/185; H01P 5/187; H01P 5/225
See application file for complete search history.

(56) References Cited

U.S. PATENT DOCUMENTS

| | | | | |
|---|---|---|---|---|
| 6,794,953 | B2 * | 9/2004 | Brandt | H01P 5/16 330/53 |
| 2014/0197901 | A1 * | 7/2014 | Bishop | H01P 5/12 333/117 |
| 2018/0062238 | A1 * | 3/2018 | Haziza | H01P 1/2002 |
| 2021/0119315 | A1 * | 4/2021 | Wrigley | H01P 5/182 |

* cited by examiner

HYBRID COUPLER WITH DIELECTRIC SUBSTRATE AND WAVEGUIDE TRANSITION

CROSS-REFERENCE TO RELATED APPLICATIONS

This application claims priority to and the benefit of GB Application No. 2 303 383.0, filed on Mar. 8, 2023. The disclosures of the above applications are incorporated herein by reference.

FIELD

The present disclosure relates to a hybrid coupler with dielectric substrate and waveguide, in particular a Suspended-Stripline Hybrid Coupler with a rectangular waveguide transition that can be used in a satellite communications antenna array, in particular for transmission and reception in the Ka-band for satellite-based communications.

BACKGROUND

The statements in this section merely provide background information related to the present disclosure and may not constitute prior art.

Antenna arrays for satellite communications are designed to meet severe mechanical and Radio Frequency (RF) performance standards. A major goal is the reduction of depth and mass of the antenna assembly while keeping RF performance at the accepted performance specifications. To meet these standards, some of the main components of currently available antennas must be replaced with smaller size and lighter weight components. The antenna array comprises of a mixture of planar as well as rectangular waveguide components. On the top level is an array of planar dipoles which receive/radiate the RF Electromagnetic (EM) wave from/to the free space. In the next level is the feeding network which is a combination of several planar and rectangular waveguides divider/combiners that work as a transmission line distribution network that guide the EM signal in two separate channels for receive "Rx" and transmit "Tx" separated by a T-Junction shape diplexer which in turn delivers/accepts the RF power to/from a Quadrature Hybrid Coupler.

The Hybrid Coupler is a 3 db directional coupler which couples the power that flows in one direction. It is a 4-port device that splits the power between the output ports (Coupled/Through) in a way that they have a quasi-equal amplitude but a phase difference of 90° between them while at the same time achieving a high isolation between the input ports. Due to the 90° phase shift on the output ports, a simultaneously dual circular polarization "CP" modes "RHCP" (Right Hand Circular Polarization) and "LHCP" (Left Hand Circular Polarization) is obtained when supplying the power to the Feeding-Network using the Hybrid. Due to the high symmetry of the hybrid design, the input ports (Isolated ports) are completely interchangeable with the output ports (Through/Coupled). The hybrid coupler is said to be a reciprocal device, due to its physical symmetry.

A classical rectangular waveguide 90° Hybrid Coupler is normally used to supply/accept the power to the feeding network which uses a relatively larger volume as well as more mass to the antenna assembly which is a main concern.

SUMMARY

This section provides a general summary of the disclosure and is not a comprehensive disclosure of its full scope or all of its features.

The present disclosure provides a compact Hybrid Coupler at small volume and mass without decreasing the performance of the hybrid coupler.

We have discovered a similar but improved (in terms of RF bandwidth performance), design to a classical Branch-Line Coupler in a planar version which is lighter and thinner than the rectangular waveguide Hybrid Coupler. The disclosure presents a solution how to integrate such a planar design to the feeding network which is designed with a hollow waveguide structure.

We have discovered a solution for the larger volume and size of the hollow rectangular hybrid coupler as well as the integration of such a planar hybrid coupler in the antenna assembly, a "90° Suspended Stripe-Line (SSL) Hybrid Coupler with rectangular waveguide ports interface" has been designed. The design of the hybrid coupler which is mainly a very thin configuration (SSL) terminated with four rectangular waveguide ports has a very high degree of integrability in the antenna assembly and has a small compact area and volume. A volume of this design presented hereinafter is a factor 2.5 lower than a standard waveguide (WG)-based hybrid coupler.

The disclosure presents a design and manufacture of a lightweight and low-profile Ka Band antenna which has a very compact volume and mass in comparison to conventional antenna designs. Additionally, the RF performance of the solution presented in this disclosure is very competitive to the current state of the art. The high degree of optimization and adjustment of the device is desired to meet different application conditions. Lightweight, thin and low profile are physical conditions for mobile applications, and applications as "manpack" antennas for a wide range of usage scenarios where satcom communications is desired. The novel hybrid coupler as presented hereinafter can be advantageously applied in such applications.

The advantage of the present disclosure over the current state of the art is its simple design and no additional manufacturing steps in the manufacturing process; and achieving a high RF performance which can be scaled to any frequency band. The hybrid coupler presented in this disclosure has a high degree of flexibility due to its small size and can be integrated within the same mechanical level of the feeding network or when needed in a different mechanical level. This will result in a reduction in the overall size and mass of the antenna.

In this disclosure, the following terms and notations are used.

Electromagnetic (EM) Waves

An EM wave comprises of oscillating/vibrating electric and magnetic fields alternating in a sinusoidal form. The change of electric fields produces magnetic fields and changing magnetic fields produce electric fields. This interplay of both electric and magnetic fields forms a propagating electromagnetic wave where electric field vectors are perpendicular (Orthogonal) to the magnetic field vectors and perpendicular to the direction of propagation. The EM Wave travels in vacuum at the speed of light and doesn't necessarily use a travelling medium for propagation.

Antennas

Antenna is a desired device in radio applications which is used as a transmitter and/or a receiver of EM waves. An Antenna is a transducer electric device that receives or transmits EM/Radio waves to/from the free space through converting energy into radio waves and the vice versa. The antenna works as a transition segment between an arrangement of electric elements/components connected electrically through a transmission line to a detector/receiver or a generator/transmitter and the free space. In transmission mode (a), a radio generator supplies an EM wave to the antenna's terminals through a transmission line, and the antenna receives the signal and radiates it into the free space. In reception mode (b), the antenna receives the incident wave that is coming from the free space and send it a receiver/detector through the transmission line to be amplified.

Frequency, Phase, Amplitude and Polarization are the Four Parameters of an EM Wave Frequency is the number of cycles a radio wave completes in one second. It is the number of times a specified event occurs within a specified time interval. A standard measure of frequency is hertz (Hz). Amplitude is the height, force or power of the wave. Wavelength is the distance between similar points on two back-to-back waves.

Phase is the relation that multiple radio signals have that share the same space and frequency. Phase is not a property of just one RF signal but instead involves the relationship between two or more signals that share the same frequency. The phase involves the relationship between the position of the amplitude crests and troughs of two waveforms. Phase can be measured in distance, time, or degrees. If the peaks of two signals with the same frequency are in exact alignment at the same time, they are said to be in phase. Conversely, if the peaks of two signals with the same frequency are not in exact alignment at the same time, they are said to be out of phase.

EM Wave Polarization

The polarization of an antenna is loosely defined as the direction of the electromagnetic fields produced by the antenna as energy radiates away from it. These directional fields determine the direction in which the energy moves away from or is received by an antenna. The "polarization" of electromagnetic waves refers to the orientation of the oscillating electric field. There are several types of polarization:

Linear polarization: Polarization is linear if the end point of the electric field vector moves on a straight line as the time moves on a straight line.

Horizontal polarization: this straight line is parallel to the earth's surface.

Vertical polarization: it is perpendicular to the earth's surface.

Slant polarization: This is a form of radio antenna polarization that is at an angle to the horizontal or vertical planes. In this way both vertical and horizontally polarized antennas are able to receive the signal.

Circular polarization: This has a number of benefits for areas such as satellite applications where it helps overcome the effects of propagation anomalies, ground reflections and the effects of the spin that occur on many satellites. Circular polarization is a little more difficult to visualize than linear polarization. However, it can be imagined by visualizing a signal propagating from an RF antenna that is rotating. The tip of the electric field vector will then be seen to trace out a helix or corkscrew as it travels away from the antenna.

Right hand circular polarization: (RHCP) In this form of polarization the vector rotates in a right-handed fashion.

Left hand circular polarization: (LHCP) In this form of polarization the vector rotates in a left-handed fashion, i.e. opposite to right handed.

Mixed (elliptical) polarization: Another form of polarization is known as elliptical polarization. It occurs when there is a mix of linear and circular polarization. This can be visualized as before by the tip of the electric field vector tracing out an elliptically shaped corkscrew.

Antenna System

In most of antenna systems, dual circularly polarized antennas are used. Beside several different technical methods different antenna polarizations can be generated, directional hybrid couplers are used to generate the circular polarization waves.

The antenna system can be constructed as follows: On the top level is the aperture which receives/radiates the EM wave from/to the free space. In the next level is the feeding network which is a combination of several planar and rectangular waveguides divider/combiners that work as a transmission line distribution network that guide the EM signal in two separate channels for receive "Rx" and transmit "Tx" separated by a T-Junction shape diplexer which in turn delivers/accepts the RF power to/from a Quadrature Hybrid Coupler. Two Hybrid couplers can be used here, one for Receive signal (Rx) and one for Transmit signal (Tx). Each of the hybrids generates a simultaneously dual circular polarization, "CP" modes "RHCP" and "LHCP", which is obtained when supplying the power to the Feeding-Network.

General convention to produce a circular polarization is done by the electric field vectors which is responsible for the wave orientation and direction. The CP is formed when the electric field vectors are equal in amplitude but 90 degree phase shift or perpendicular to each other's. And this is exactly what is taken into consideration when designing a hybrid coupler to generate a Circular polarized wave.

The hybrid coupler splits the power between the output ports (E1 and E2) in a way that they have a quasi-equal amplitude but a phase difference of 90° between them which lead to a circularly polarized wave as a result of adding the two electric field vectors together (E1+E2).

Antenna Axial Ratio:

Is the ratio between the major and minor axis (the two orthogonal electric field vectors) of a circularly polarized antenna pattern. If an antenna has perfect circular polarization, then this ratio would be 1 (0 dB). When the EM power is supplied to a microwave system to be further transmitted some of the power is absorbed in the system along the components, some of it is being reflected and the rest is being transmitted.

Return loss is the quotient of incident power to reflected power.

Insertion loss is the quotient of incident power to transmitted power.

These ratios are expressed in dB terminology (Decibel) which is a method that uses logarithmic calculation to measure signals that increase or decrease rapidly or exponentially by comparing the output to the input signals.

$$\text{Insertion Loss (dB)} = 10 * \text{Log}\left(\text{Incident power }(W)/\text{Transmitted power }(W)\right)$$

$$\text{Return Loss (dB)} = 10 * \text{Log}\left(\text{Incident}(W)/\text{Reflected power}(W)\right)$$

The electric behavior of a microwave system/EM component can be described by analyzing its scattering parameters. When analyzing the quadratic hybrid coupler the following S-Parameters can be obtained:

S1,1 is the reflection parameter at the Input port

S4,1 is the isolation parameter at the Isolated port

S2,1 and S3,1 are the transmission parameters at the output ports (Through and Coupled Ports)

The value of these parameters is also expressed in dB.

Waveguide

A waveguide or a waveguide transition as described in this disclosure is a structure that guides or transmits waves, such as electromagnetic waves, with a reduced loss of energy by restricting the transmission of energy to one direction.

A ridged waveguide as described in this disclosure is a waveguide with conducting ridges protruding into the center of the waveguide from the top wall or bottom wall or both walls. The ridges are parallel to the short wall of the waveguide. A rectangular waveguide with a single protruding ridge from the top or bottom wall is called a Single Ridged Waveguide. A rectangular waveguide with a ridge from the top and bottom wall is called a Double Ridged Waveguide. Ridged Waveguides have a lower impedance and wider bandwidth in their fundamental mode when compared to regular rectangular waveguides. They also have a lower cut-off frequency and have lower power handling capabilities. Ridged waveguides can be used for impedance matching as they decrease the characteristic impedance of the waveguide. Besides, they offer higher bandwidth in comparison to the conventional waveguides.

Stripline

A stripline or stripline circuit as described in this disclosure uses a flat strip of metal which is sandwiched between two parallel ground planes. The insulating material of the substrate forms a dielectric. The width of the strip, the thickness of the substrate and the relative permittivity of the substrate determine the characteristic impedance of the strip which is a transmission line. The central conductor need not be equally spaced between the ground planes. In the general case, the dielectric material may be different above and below the central conductor. To inhibit the propagation of unwanted modes, the two ground planes should be shorted together. This can be achieved by a series of vias that may run parallel to the strip on each side.

Suspended Stripline

A suspended stripline (SSL) as described in this disclosure is etched out on a thin substrate and the entire structure is enclosed. Thus, the stripline is suspended in the metallic structure. The suspended stripline has air as dielectric on both sides. The suspended stripline configuration supports almost pure TEM mode propagation. The SSL has the following advantages over other Strip-line technologies: No spurious radiation; wider bandwidth of operation; low losses; and high Q factor.

Ka-Band

In this disclosure communication in the Ka-band is described. Specifically, the frequency range of the Ka-band, as defined by the IEEE system, is from 26 to 40 GHZ, with a wavelength of 11.5 mm at 26 GHz and 7.5 mm at 40 GHz in free space. The Ka-band spectrum is widely used for broadband data communications, mobile phone and data applications, and direct-to-home (DTH) broadcasting. Ka-band transceivers, transmitters, and receivers provide high data throughput and bandwidth due to their operation in this Ka-band part of the frequency spectrum. Most High Throughput Satellites (HTS) operating in the Ka-band typically fall within the following Ka-bands: 27.5-31 GHZ (uplink) and 17.7-21.2 GHZ (downlink), for a 3.5 GHz bandwidth.

According to a first aspect, the disclosure relates to a hybrid coupler for transmitting equally splitted amplitude and quadrature phase electro-magnetic waves, the hybrid coupler comprising: a dielectric substrate having a first main surface and a second main surface opposing the first main surface; a stripline placed at the first main surface of the dielectric substrate, the stripline comprising an input port and two output ports, the stripline being formed to provide an equally splitted amplitude and quadrature phase electro-magnetic wave at the output ports based on an input signal received at the input port; and a rectangular waveguide transition attached to both of the main surfaces of the substrate, the rectangular waveguide transition being configured to transmit the equally splitted amplitude and quadrature phase electro-magnetic wave to an antenna.

The rectangular waveguide transition is attached to both main surfaces of the substrate to deliver and transmit the EM signal to radiator devices and vice versa.

Such a hybrid coupler has a simple design and can be manufactured in a few manufacturing steps. The hybrid coupler achieves a high RF performance which can be scaled to any frequency band. Besides, the hybrid coupler has a high degree of flexibility due to its small size and can be integrated within the same mechanical level of the feeding network or, if desired, in a different mechanical level. This will result in a reduction in the overall size and mass of the antenna.

In an exemplary implementation of the hybrid coupler, the stripline comprises a suspended-stripline, SSL.

Such suspended-stripline provides the advantages of no spurious radiation, wider bandwidth of operation, low losses and high Q factor.

In an exemplary implementation of the hybrid coupler, the stripline further comprises an isolated port; wherein the stripline comprises a base section and four arms electrically connecting the base section with the input port, the two output ports and the isolated port of the stripline, respectively.

This design is simple to manufacture and highly symmetrical due to the four arms extending from the common base section. Due to its symmetry a high performance can be achieved as illustrated below in the performance diagrams.

In an exemplary implementation of the hybrid coupler, each of the four arms of the stripline comprises one or more matching elements, the one or more matching elements being configured to match the stripline to the waveguide transition.

This provides the advantage that a high matching of the stripline to the waveguide transition can be achieved by using an improved design of the matching elements. The improved design can be predetermined in simulations, for example.

In an exemplary implementation of the hybrid coupler, the two arms of the four arms connecting the base section with the input port and the isolated port are shaped symmetrically to the other two arms of the four arms connecting the base section with the two output ports.

Due to the symmetrical design of the arms, the hybrid coupler can be easily manufactured and high performance of S-parameters can be achieved for the hybrid coupler.

In an exemplary implementation of the hybrid coupler, the base section of the stripline comprises a metal layer formed at the first main surface of the dielectric substrate, the metal layer comprising an opening formed at a center of the base section.

This provides the advantage that the metal layer can be easily etched in a printed circuit board and the opening at the center of the base section can be designed for optimally matching the stripline to the waveguide transition as well as matching between the four arms (Traces) of the SSL Hybrid to achieve an improved wideband AR performance.

In an exemplary implementation of the hybrid coupler, the substrate is a printed circuit board comprising a top side metallization and/or a bottom side metallization; and the stripline is formed as an etched signal trace within the top side metallization or the bottom side metallization of the printed circuit board.

This provides the advantage that the hybrid coupler can be easily manufactured when using a printed circuit board. The manufacturing steps for producing the stripline can be efficiently performed by a production machine.

In an exemplary implementation of the hybrid coupler, the hybrid coupler comprises: an upper ground plane arranged above the first main surface of the substrate outside an area of the substrate forming the input and output ports of the stripline; a lower ground plane arranged below the second main surface of the substrate outside the area of the substrate forming the input and output ports of the stripline; and a series of vias electrically connecting the upper ground plane with the lower ground plane.

This provides the advantage that such an arrangement of a suspended stripline can be easily manufactured. This suspended stripline configuration supports almost pure TEM mode propagation and provides the advantages of no spurious radiation, wider bandwidth of operation, low losses and high Q factor.

In an exemplary implementation of the hybrid coupler, the waveguide transition is formed to transmit the equally splitted amplitude and quadrature phase electro-magnetic wave in a direction orthogonal or parallel to the first main surface of the stripline or in a direction in between the orthogonal and parallel direction.

This provides the advantage of high flexibility with regard to the radiation direction.

In an exemplary implementation of the hybrid coupler, the waveguide transition comprises a plurality of stepped waveguide transition sections, each stepped waveguide transition section attached to a respective port of the stripline.

This provides the advantage that by such stepped waveguide transition sections the impedance can be shaped for an improved match of the stripline to the waveguide, hence improving the antenna gain.

In an exemplary implementation of the hybrid coupler, the waveguide transition comprises a plurality of double-ridged waveguide transition sections, each double-ridged waveguide transition section attached to a respective port of the stripline.

Such double-ridge waveguide transition sections provide the advantage of a low impedance and wide bandwidth in its fundamental mode when compared to a regular rectangular waveguide. The double-ridge waveguide transition also has a lower cut-off frequency. The double-ridge waveguide transition can be efficiently used for impedance matching as it decreases the characteristic impedance of the waveguide. Besides, the double-ridge waveguide transition offers higher bandwidth in comparison to a regular rectangular waveguide transition.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
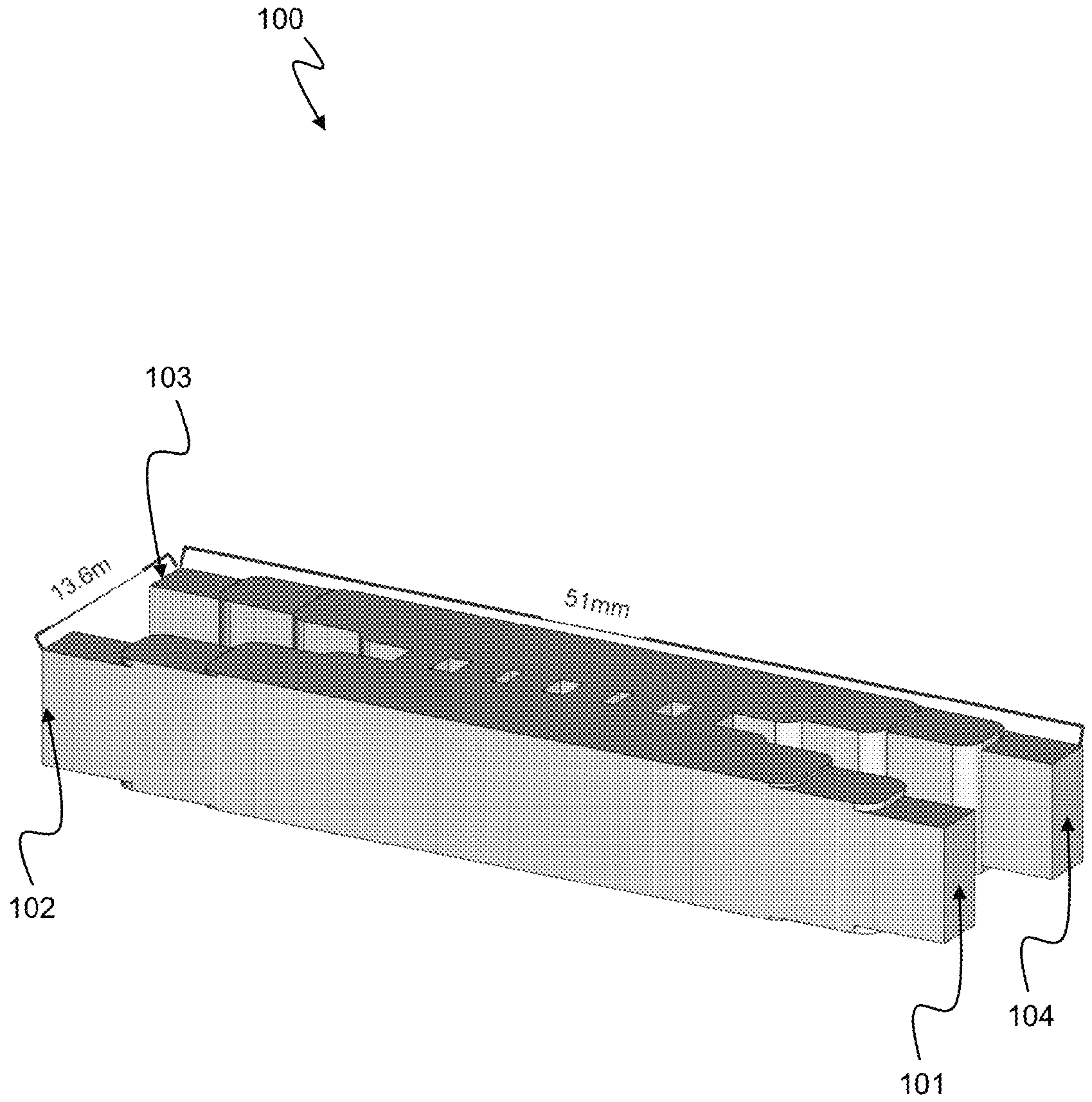
FIG. 1 shows a perspective view of a schematic diagram illustrating a 3D structure of a hollow rectangular directional hybrid coupler according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. Further, it is understood that the features of the various exemplary aspects described herein may be combined with each other, unless specifically noted otherwise.

FIG. 1 shows a schematic diagram illustrating a 3D structure of a hollow rectangular directional hybrid coupler 100.

The hollow rectangular directional hybrid coupler 100 has an input port 101, an isolated port 104, a through port 102 and a coupled port 103.

Such a design has several couplers in cascade and uses impedance matching steps to obtain RF wideband performance.

The hybrid coupler 100 is a 3 db directional coupler which couples the power that flows in one direction. It is a 4-port device that splits the power between the output ports 103, 102 (Coupled/Through) in a way that they have a quasi-equal amplitude but a phase difference of 90° between them while at the same time achieving a high isolation between the input ports 101, 104.

Figure 7:
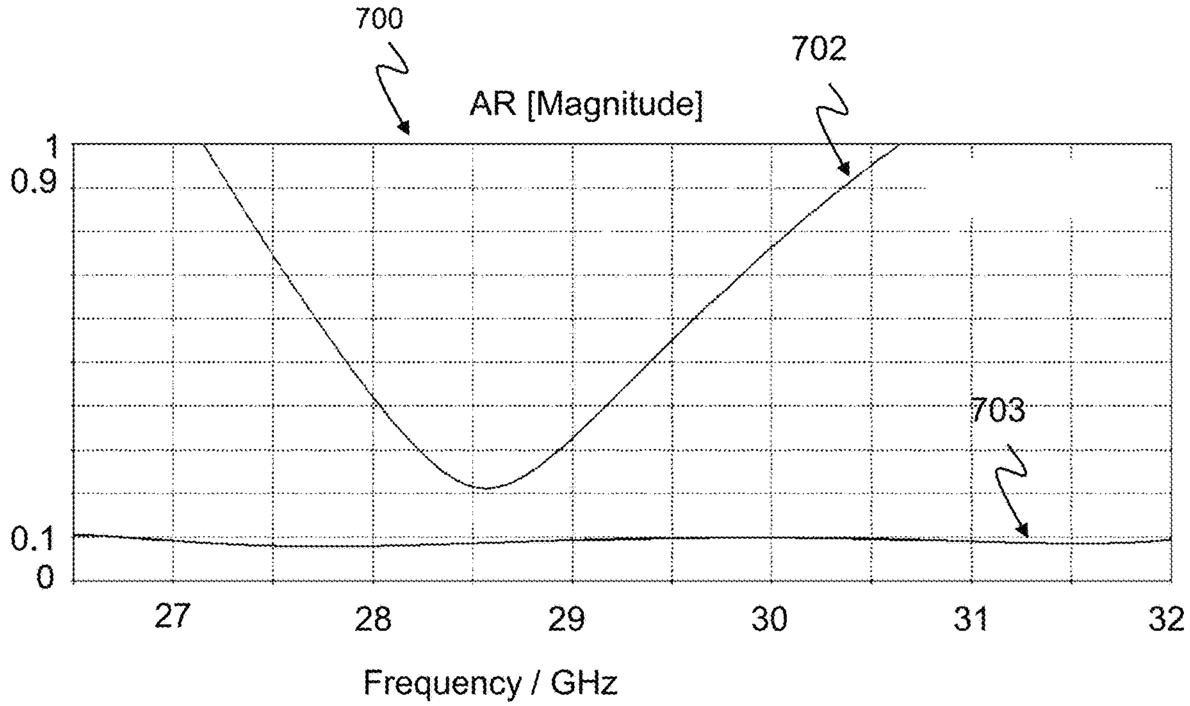
FIG. 7 shows a performance diagram illustrating an axial ratio plot of the branch line hybrid coupler shown in FIG. 6 compared to the novel hybrid coupler shown in FIG. 4.

However, the hybrid coupler 100 is a compact device that uses a large volume and has a high mass. In this disclosure, a novel hybrid coupler design is presented that reduces the size and mass of the hybrid coupler 100. The design is presented in FIGS. 2 to 4. Performance of the novel design is shown in FIGS. 5 and 7.

Figure 2:
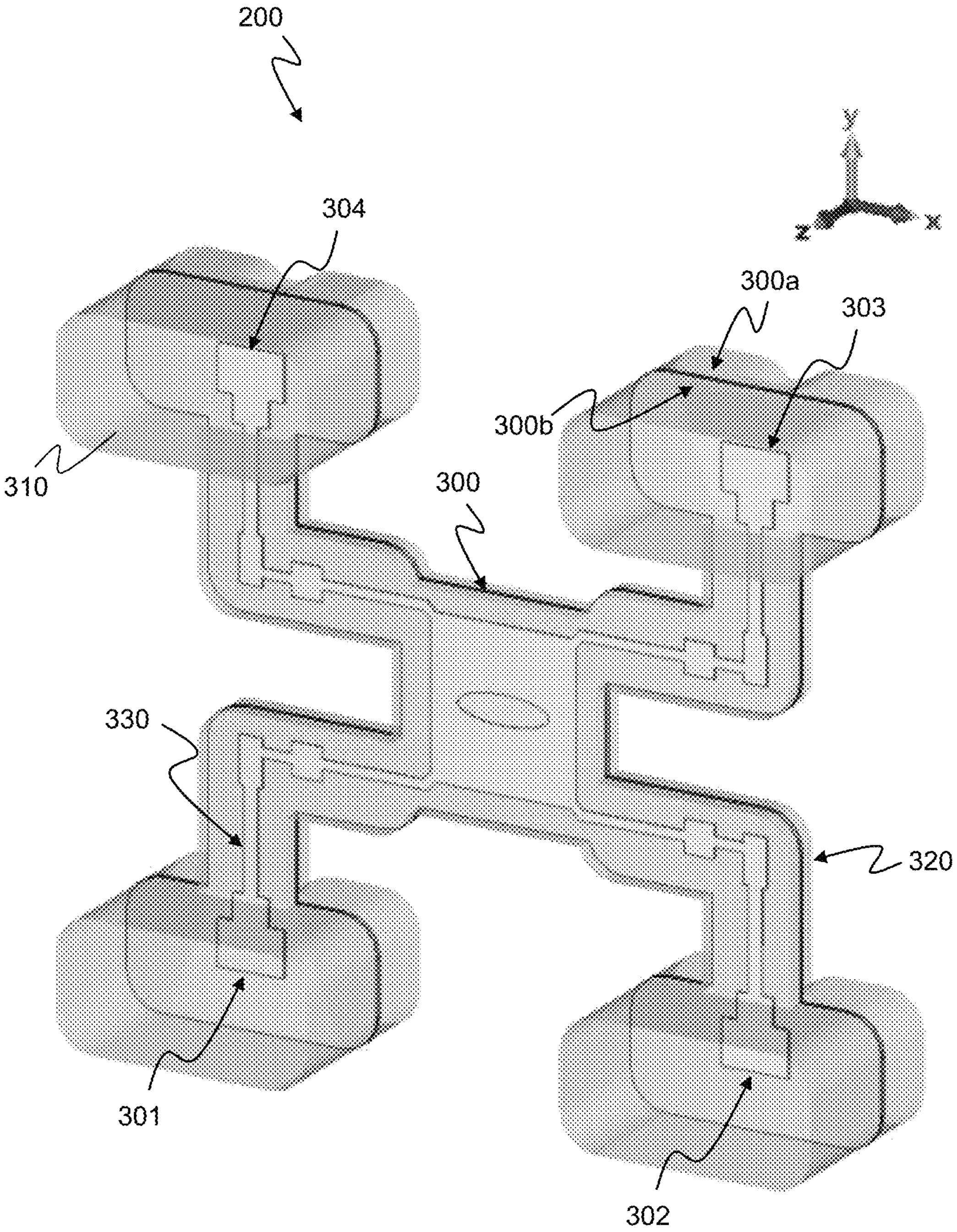
FIG. 2 shows a perspective view of a schematic diagram illustrating a 3D structure of a hybrid coupler according to the present disclosure.

FIG. 2 shows a schematic diagram illustrating a 3D structure of a hybrid coupler 200 according to the disclosure.

The hybrid coupler 200 comprises mainly of two parts; an SSL Hybrid Coupler plus four SSL to rectangular waveguide transitions. FIG. 2 is a general 3D view of the hybrid structure showing the waveguide geometry and the SSL PCB inside.

The hybrid coupler 200 can be used for transmitting equally splitted amplitude and quadrature phase electro-magnetic waves.

The hybrid coupler 200 comprises a dielectric substrate 300 having a first main surface 300*a* and a second main surface 300*b* opposing the first main surface 300*a*. The dielectric substrate 300 is shown in detail in FIG. 3.

The hybrid coupler 200 comprises a stripline 330 placed at the first main surface 300*a* of the dielectric substrate 300. It is understood that the stripline 330 can alternatively also be placed at the second main surface 300*b*. The stripline 330 comprises an input port 301, isolated port 304 and two output ports 302, 303. The stripline 330 is formed to provide an equally splitted amplitude and quadrature phase electro-magnetic wave at the output ports 302, 303 based on an input signal received at the input port 301.

The hybrid coupler 200 comprises a rectangular wave-guide transition 310 attached to both of the main surfaces 300*a*, 300*b* of the substrate 300. The waveguide transition 310 is configured to transmit the electro-magnetic wave to an antenna or to the next device. In FIG. 2, the waveguide transition 310 may have four portions, each one attached to a respective port of the hybrid coupler 200. On the opposite side of 310 is a double ridge waveguide "Backshort".

The stripline 330 may comprise a suspended-stripline, SSL 320 as shown in the design of FIG. 2. However, a stripline 330 without SSL can also be realized.

The stripline 330 further comprises an isolated port 304 as shown in FIG. 2.

Figure 3:
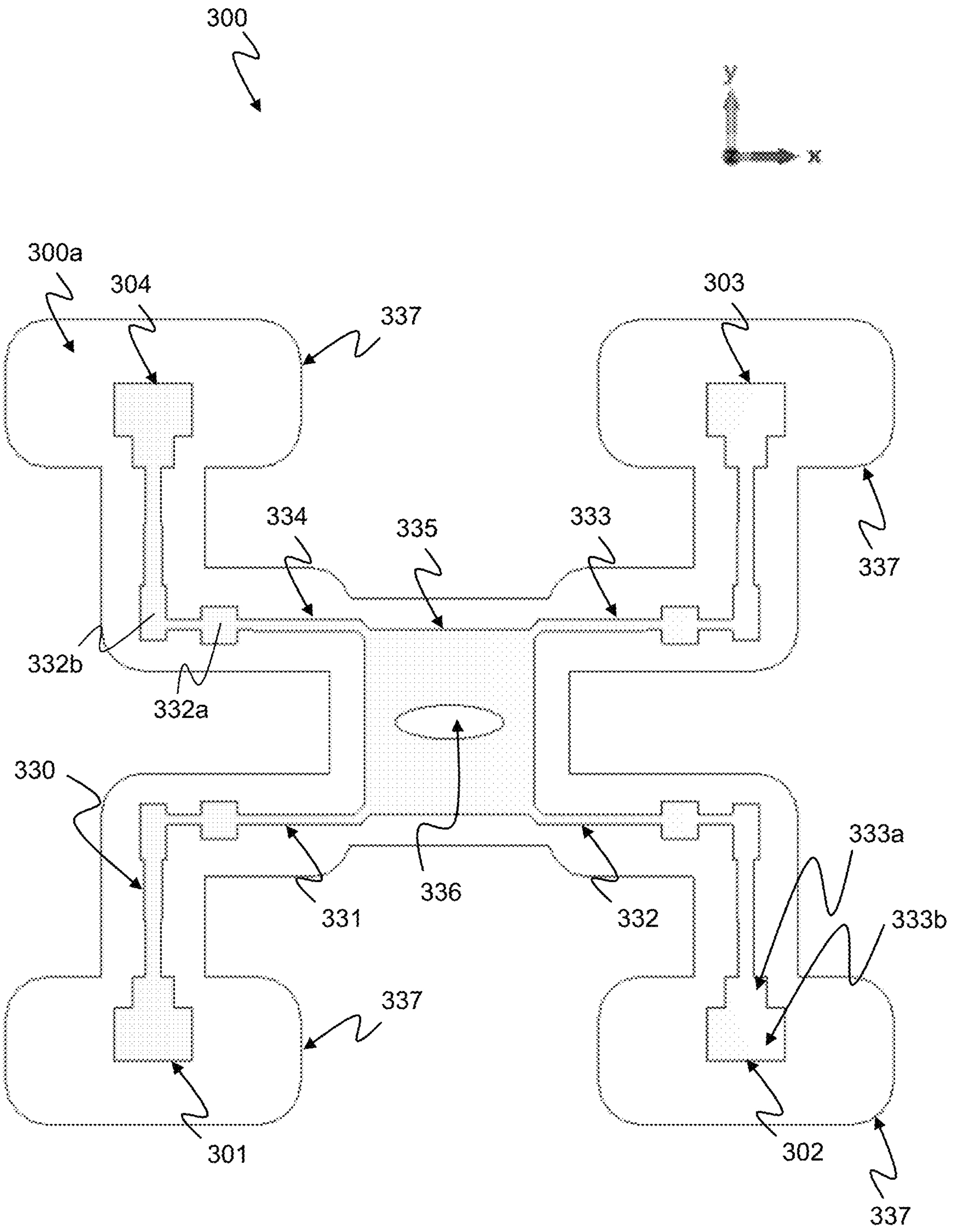
FIG. 3 shows a top view of a schematic diagram illustrating the top side of the substrate of the directional coupler according to the present disclosure.

The stripline 330 may comprise a base section 335 and four arms 331, 332, 333, 334 as shown in more detail in FIG. 3, the arms 331, 332, 333, 334 electrically connecting the base section 335 with the input port 301, the two output ports 302, 303 and the isolated port 304 of the stripline 330, respectively.

Each of the four arms 331, 332, 333, 334 of the stripline 330 may comprise one or more matching elements 332*a*, 332*b*, 333*a*, 333*b* as shown in more detail in FIG. 3. The one or more matching elements 332*a*, 332*b*, 333*a*, 333*b*, may be configured to match the stripline 330 to the waveguide transition 310 as well as impedance matching of the SSL hybrid itself.

The hybrid coupler 200 has a symmetrical design. The two arms 331, 334 of the four arms 331, 332, 333, 334 connecting the base section 335 with the input port 301 and the isolated port 304 may be shaped symmetrically to the other two arms 332, 333 of the four arms 331, 332, 333, 334 connecting the base section 335 with the two output ports 302, 303.

The base section 335 of the stripline 330 may comprise a metal layer formed at the first main surface 330*a* of the dielectric substrate 300. This metal layer may comprise an opening 336 formed at a center of the base section 335 as shown in more detail in FIG. 3.

The substrate 300 can be a printed circuit board comprising a top side metallization and/or a bottom side metallization. The stripline 330 may be formed as an etched signal trace within the top side metallization or the bottom side metallization of the printed circuit board.

Figure 4:
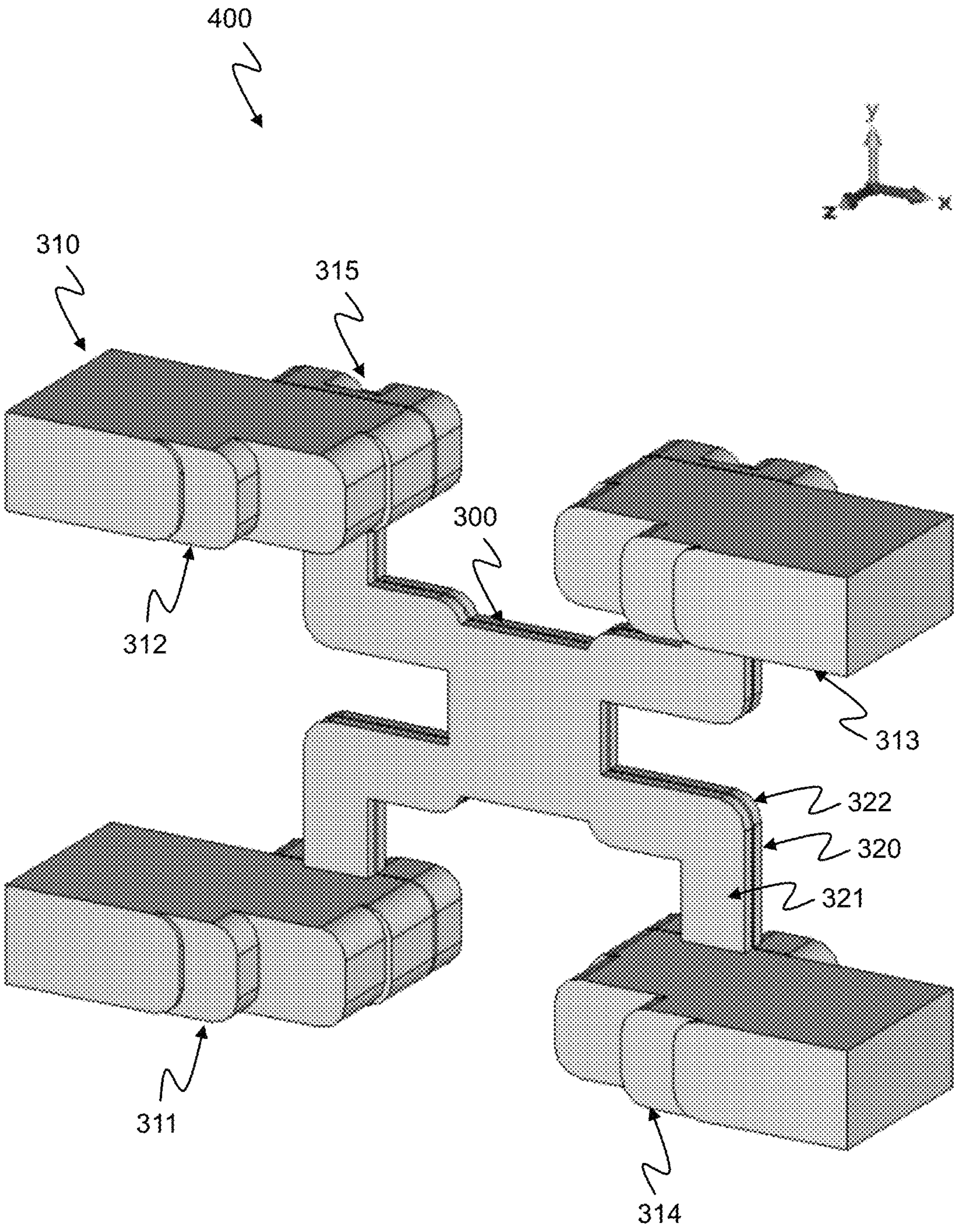
FIG. 4 shows a perspective view of a schematic diagram illustrating a 3D structure of a hybrid coupler according to another implementation of the present disclosure.

The hybrid coupler 200 may comprise an upper ground plane 321 arranged above the first main surface 300*a* of the substrate 300 outside an area 337 of the substrate 300 forming the input and output ports of the stripline 330 as shown in more detail in FIG. 4.

The hybrid coupler 200 may comprise a lower ground plane 322 arranged below the second main surface 300*b* of the substrate 300 outside the area 337 of the substrate 300 forming the input and output ports of the stripline 330 as shown in more detail in FIG. 4. A series of vias may electrically connect the upper ground plane with the lower ground plane (not shown).

The waveguide transition 310 may be formed to transmit the equally splitted amplitude and quadrature phase electro-magnetic wave in a direction orthogonal or parallel to the first main surface 300*a* of the stripline 330 or in a direction in between the orthogonal and parallel direction. FIG. 2 shows the configuration where the EM-wave is transmitted orthogonal to the first main surface 300*a* (and also to the second main surface 300*b*). FIG. 4 shows the configuration where the EM-wave is transmitted parallel to the first main surface 300*a* (and also to the second main surface 300*b*).

The waveguide transition 310 may comprise a plurality of stepped waveguide transition sections 311, 312, 313, 314 as shown in FIG. 4. Each stepped waveguide transition section 311, 312, 313, 314 may be attached to a respective port 301, 302, 303, 304 of the stripline 330.

The waveguide transition 310 may comprise a plurality of double-ridged waveguide transition sections 315. Each double-ridged waveguide transition section 315 may be attached to a respective port 301, 302, 303, 304 of the stripline 330, as shown in FIG. 2 for example.

FIG. 3 shows a schematic diagram illustrating the top side 300*a* of the substrate 300 of the directional coupler 200.

In FIG. 3 an example of an SSL Layout is shown with the hybrid structure and transmission line matching elements, and E-Field probe to launch RF energy into the waveguide.

As described above with respect to FIG. 2, the hybrid coupler 200 comprises a dielectric substrate 300 having a first main surface 300*a* and a second main surface 300*b* opposing the first main surface 300*a*. FIG. 3 shows the first main surface 300*a* of the dielectric substrate 300.

The stripline 330 is placed at the first main surface 300*a* of the dielectric substrate 300. The stripline 330 comprises an input port 301 and two output ports 302, 303. The stripline 330 is formed to provide an equally splitted amplitude and quadrature phase electro-magnetic wave at the output ports 302, 303 based on an input signal received at the input port 301.

The stripline 330 may comprise a suspended-stripline, SSL 320 as shown here in the example of FIG. 3. However, a stripline 330 without SSL can also be realized.

The stripline 330 further comprises an isolated port 304 as shown in FIG. 2.

The stripline 330 comprises a base section 335 and four arms 331, 332, 333, 334. The arms are electrically connecting the base section 335 with the input port 301, the two output ports 302, 303 and the isolated port 304 of the stripline 330, respectively.

Each of the four arms 331, 332, 333, 334 comprise a plurality of matching elements 332*a*, 332*b*, 333*a*, 333*b* etc. as shown in FIG. 3. The matching elements 332*a*, 332*b*, 333*a*, 333*b* are configured to match the stripline 330 to the waveguide transition 310.

As can be seen from FIG. 3, the hybrid coupler 200 and thus also the substrate 300 and the stripline 330 have a symmetrical design. The two arms 331, 332 of the four arms 331, 332, 333, 334 connecting the base section 335 with the input port 301 and the isolated port 304 are shaped symmetrically to the other two arms 333, 334 of the four arms 331, 332, 333, 334 connecting the base section 335 with the two output ports 302, 303.

The base section 335 of the stripline 330 may comprise a metal layer, e.g., made of Copper, formed at the first main surface 330*a* of the dielectric substrate 300. This metal layer comprises an opening 336 formed at a center of the base section 335.

The substrate 300 can be a printed circuit board with top side metallization and/or a bottom side metallization. The stripline 330 can be formed as an etched signal trace within the top side metallization or the bottom side metallization of the printed circuit board.

In the SSL design as shown in FIGS. 2 and 3, an upper ground plane 321 (see FIG. 4) can be arranged above the first main surface 300*a* of the substrate 300 outside an area 337 of the substrate 300 forming the input and output ports of the stripline 330. A lower ground plane 322 (see FIG. 4) can be arranged below the second main surface 300*b* of the substrate 300 outside the area 337 of the substrate 300 forming the input and output ports of the stripline 330.

FIG. 4 shows a schematic diagram illustrating a 3D structure of a hybrid coupler 400 according to another implementation.

FIG. 4 particularly shows one of several possible configurations to connect the hybrid.

The hybrid coupler 400 comprises a dielectric substrate 300 that may be formed as described above with respect to FIG. 3.

A rectangular waveguide transition 310 is attached to both of the main surfaces 300*a*, 300*b* of the substrate 300. Here in FIG. 4, the waveguide transition 310 has four portions which are attached to both main surfaces 300*a*, 300*b* of the substrate 300. Each portion is attached to a respective port of the hybrid coupler 400. The waveguide transition 310 is configured to transmit the equally splitted amplitude and quadrature phase electro-magnetic wave to an antenna.

The stripline 330 may comprise or may be a suspended-stripline, SSL 320 as can be seen from FIG. 4. As described above, also a design without SSL where the waveguide transition 310 is directly attached to the substrate 300, e.g., PCB can be implemented (not shown).

The stripline 330 further comprises an isolated port 304.

As described above, the design of the stripline 330 may correspond to the design shown in FIG. 3.

The substrate 300 can be a printed circuit board comprising a top side metallization and/or a bottom side metallization. As described above, the stripline 330 may be formed as an etched signal trace within the top side metallization or the bottom side metallization of the printed circuit board.

The hybrid coupler 400, in particular the SSL 320, may comprise an upper ground plane 321 arranged above the first main surface 300*a* of the substrate 300 outside an area 337 (shown in FIG. 3) of the substrate 300 forming the input and output ports of the stripline 330. The hybrid coupler 400 may comprise a lower ground plane 322 arranged below the second main surface 300*b* of the substrate 300 outside the area 337 of the substrate 300 forming the input and output ports of the stripline 330. A series of vias may electrically connect the upper ground plane with the lower ground plane (not shown).

The waveguide transition 310 may be formed to transmit the equally splitted amplitude and quadrature phase electro-magnetic wave in a direction orthogonal or parallel to the first main surface 300*a* of the stripline 330 or in a direction in between the orthogonal and parallel direction. FIG. 4 shows the configuration where the EM-wave is transmitted parallel to the first main surface 300*a* (and also to the second main surface 300*b*).

The waveguide transition 310 comprises a plurality of stepped waveguide transition sections 311, 312, 313, 314. Each stepped waveguide transition section 311, 312, 313, 314 may be attached to a respective port 301, 302, 303, 304 of the stripline 330. These stepped waveguide transition sections 311, 312, 313, 314 are attached to the first main surface 300*a* of the substrate 300 (top side) as can be seen from FIG. 4.

The waveguide transition 310 comprises a plurality of double-ridged waveguide transition sections 315. Each double-ridged waveguide transition section 315 may be attached to a respective port 301, 302, 303, 304 of the stripline 330. These double-ridged waveguide transition sections 311, 312, 313, 314 are attached to the second main surface 300*b* (bottom side) of the substrate 300 as can be seen from FIG. 4.

Figure 5A:
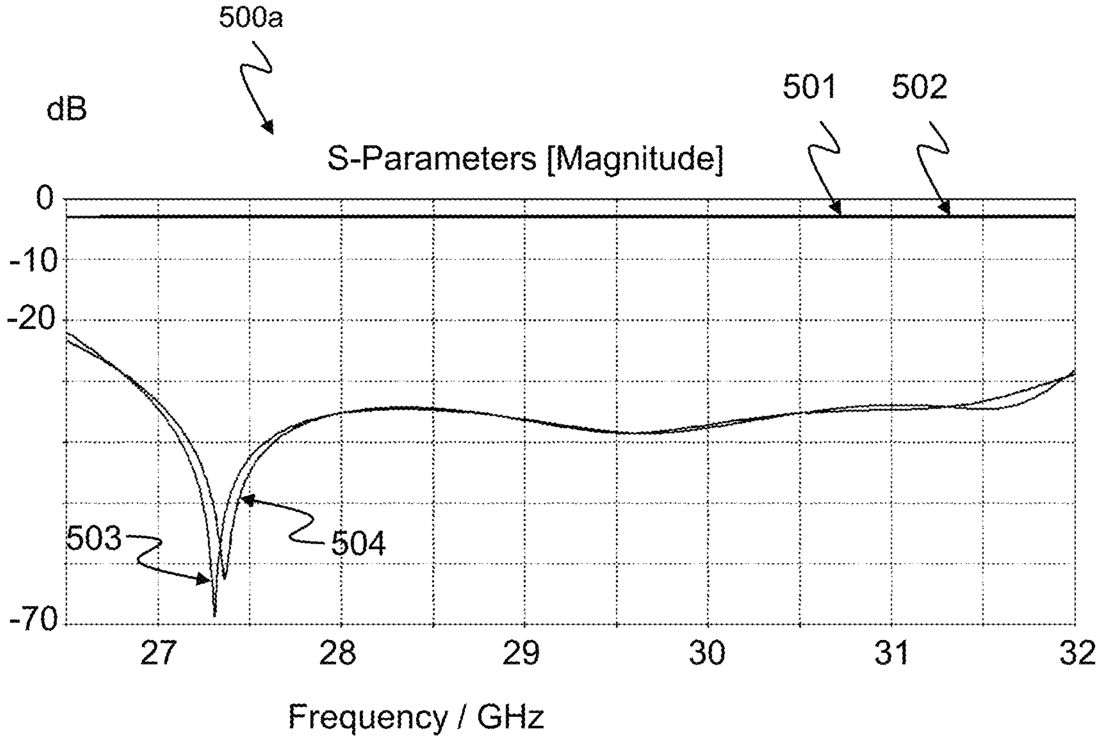
FIG. 5A shows a performance diagram illustrating S-parameters of the hybrid coupler shown in FIG. 4.

FIG. 5A shows a performance diagram 500*a* illustrating S-parameters of the hybrid coupler 400 shown in FIG. 4.

In this 4 port device, there are 4 Scattering parameters per port (S-parameters) which represent the incident and reflected power signals for a specific frequency band which can be scaled to other bands.

The following S-parameters of the hybrid coupler 400 are shown:

S1,1 (graph 504) is the reflection parameter (Input port)

S4,1 (graph 503) is the isolation parameter (Isolated port)

S2,1 (graph 501) and S3,1 (graph 502) are the transmission parameters (Through and Coupled ports).

The S-parameters show that excellent transmission (graphs 501, 502) and reflection (graphs 503, 504) properties can be achieved with the novel hybrid coupler 400.

Figure 5B:
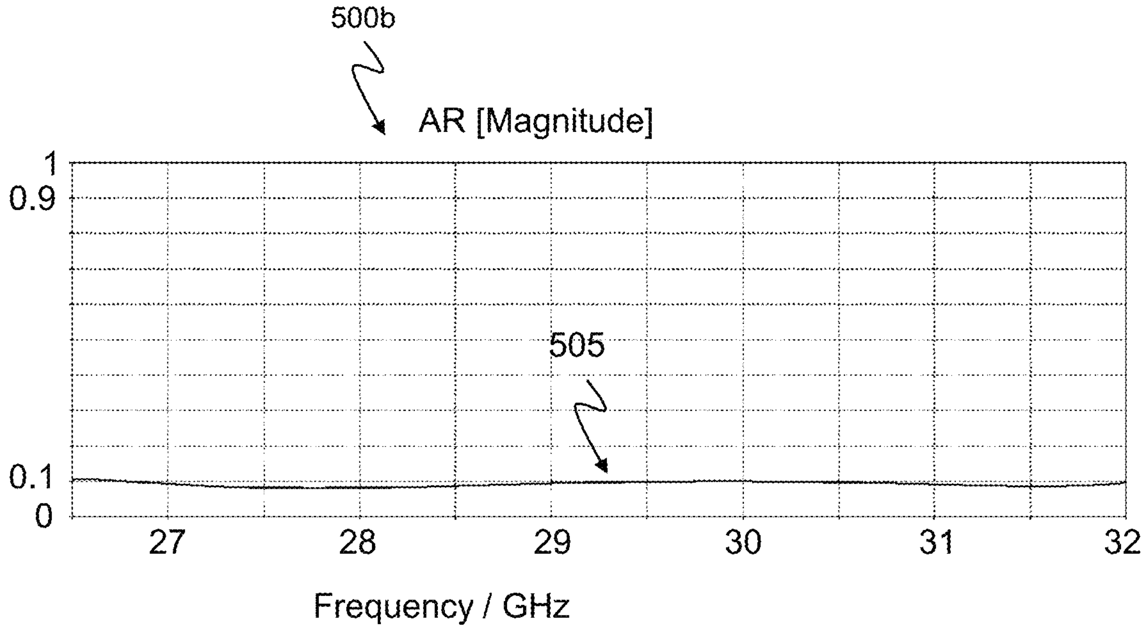
FIG. 5B shows a performance diagram illustrating an axial ratio (AR) of the hybrid coupler shown in FIG. 4.

FIG. 5B shows a performance diagram 500*b* illustrating an axial ratio (AR) of the hybrid coupler 400 shown in FIG. 4.

Next is Axial Ratio (AR) in dB (graph 505) which is the ratio of two orthogonal electric field components equal in amplitude with 90 degrees phase shift. This is a fundamental performance parameter for any circular polarized antenna. Typical satcom applications desire the axial ratio to be <1 dB.

As can be seen from FIG. 5B, the novel hybrid coupler 400 can even provide axial ratio less than 0.1 dB.

Figure 6:
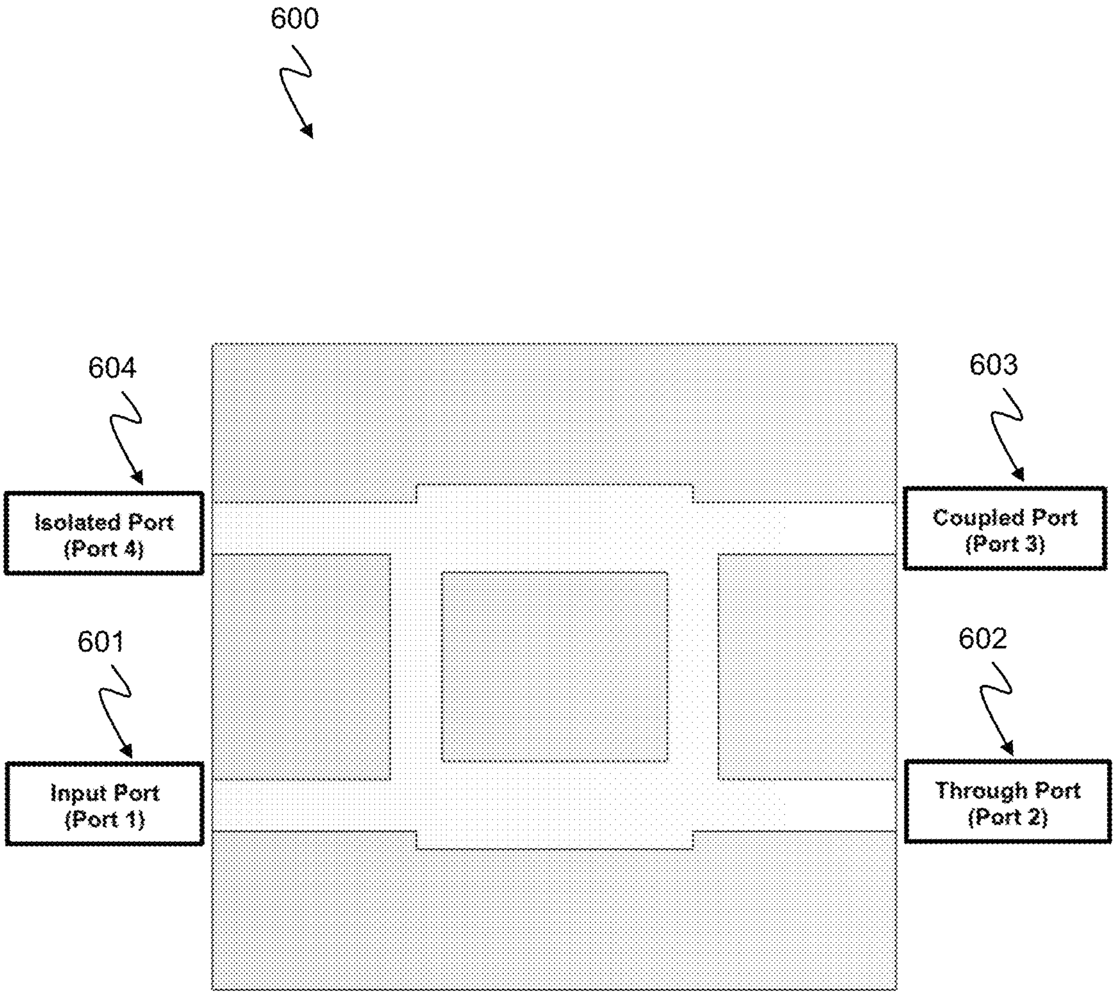
FIG. 6 shows a schematic diagram illustrating an example of a typical branch line hybrid coupler according to the present disclosure.

FIG. 6 shows a schematic diagram illustrating an example of a typical branch line hybrid coupler 600 without including the waveguide transitions.

The hybrid coupler has an input port 601, an isolated port 604 and two output ports 602, 603.

The hybrid coupler 600 splits the power between the output ports 602, 603 (E1 and E2) in a way that they have a quasi-equal amplitude but a phase difference of 90° between them which lead to a circularly polarized wave when connected to an antenna as a result of adding the two electric field vectors together (E1+E2).

FIG. 7 shows a performance diagram illustrating an axial ratio plot 700 of the branch line hybrid coupler 600 shown in FIG. 6 compared to the novel hybrid coupler 400 shown in FIG. 4.

The plot 702 of the branch line hybrid coupler 600 indicates a relatively narrow band performance for the desired frequency band. This hybrid coupler design uses fundamental changes and optimization to reach the desired RF performance. Such changes may include cascading multiple couplers to achieve the wide band width for both matching parameters and the axial ratio which consequently will add more area to the overall design.

The plot 703 corresponds to the plot 505 of FIG. 5B of the novel hybrid coupler design.

As can be seen from FIG. 7, the plot 703 of the novel hybrid coupler 400 shows excellent performance over the whole frequency band between 26 and 32 GHz. An axial ratio less than 0.1 dB can be provided over this broad frequency band.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the present disclosure beyond those described herein. While the present disclosure has been described with reference to one or more particular forms, those skilled in the art recognize that many changes may be made thereto without departing from the scope of the present disclosure. It is therefore to be understood that within the scope of the appended claims and their equivalents, the present disclosure may be practiced otherwise than as specifically described herein.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A hybrid coupler for transmitting equally splitted amplitude and quadrature phase electro-magnetic waves, the hybrid coupler comprising:

a dielectric substrate having a first main surface and a second main surface opposing the first main surface;

a stripline placed at the first main surface of the dielectric substrate, the stripline comprising an input port and two output ports, wherein the stripline is formed to provide an equally splitted amplitude and quadrature phase electro-magnetic wave at the two output ports based on an input signal received at the input port; and a rectangular waveguide transition attached to both the first main surface and the second main surface of the dielectric substrate, wherein the rectangular waveguide transition is configured to transmit the equally splitted amplitude and quadrature phase electro-magnetic wave to an antenna, wherein the dielectric substrate is a printed circuit board comprising at least one of a top side metallization and a bottom side metallization; and wherein the stripline is formed as an etched signal trace within the top side metallization or the bottom side metallization of the printed circuit board.

2. The hybrid coupler of claim 1, further comprising:

an upper ground plane arranged above the first main surface of the dielectric substrate outside an area of the dielectric substrate forming the input port and the two output ports of the stripline;

a lower ground plane arranged below the second main surface of the dielectric substrate outside the area of the dielectric substrate forming the input port and the two output ports of the stripline; and a series of vias electrically connecting the upper ground plane with the lower ground plane.

3. The hybrid coupler of claim 1, wherein the rectangular waveguide transition is formed to transmit the equally splitted amplitude and quadrature phase electro-magnetic wave in a direction orthogonal to the first main surface of the stripline.

4. The hybrid coupler of claim 1, wherein the rectangular waveguide transition is formed to transmit the equally splitted amplitude and quadrature phase electro-magnetic wave in a direction parallel to the first main surface of the stripline.

5. The hybrid coupler of claim 1, wherein the rectangular waveguide transition is formed to transmit the equally splitted amplitude and quadrature phase electro-magnetic wave in a direction in between an orthogonal direction of the first main surface of the stripline and a parallel direction of the first main surface of the stripline.

6. The hybrid coupler of claim 1, wherein the rectangular waveguide transition comprises a plurality of double-ridged waveguide transition sections, each double-ridged waveguide transition section of the plurality of double-ridged waveguide transition sections are attached to a respective port of the input port and the two output ports of the stripline.

7. A hybrid coupler for transmitting equally splitted amplitude and quadrature phase electro-magnetic waves, the hybrid coupler comprising:

a dielectric substrate having a first main surface and a second main surface opposing the first main surface;

a stripline placed at the first main surface of the dielectric substrate, the stripline comprising an input port and two output ports, wherein the stripline is formed to provide an equally splitted amplitude and quadrature phase electro-magnetic wave at the two output ports based on an input signal received at the input port; and a rectangular waveguide transition attached to both the first main surface and the second main surface of the dielectric substrate, wherein the rectangular waveguide transition is configured to transmit the equally splitted amplitude and quadrature phase electro-magnetic wave to an antenna, wherein the rectangular waveguide transition comprises a plurality of stepped waveguide transition sections, each stepped waveguide transition section of the plurality of stepped waveguide transition sections are attached to a respective port of the input port and the two output ports of the stripline.

8. The hybrid coupler of claim 7, wherein the stripline comprises a suspended-stripline, SSL.

9. The hybrid coupler of claim 7, wherein the stripline further comprises an isolated port, and wherein the stripline comprises a base section and four arms electrically connecting the base section with the input port, the two output ports and the isolated port of the stripline, respectively.

10. The hybrid coupler of claim 9, wherein each of the four arms of the stripline comprises one or more matching elements, and wherein the one or more matching elements are configured to match the stripline to the rectangular waveguide transition.

11. The hybrid coupler of claim 9, wherein two arms of the four arms connecting the base section with the input port and the isolated port are shaped symmetrically to another two arms of the four arms connecting the base section with the two output ports.

12. The hybrid coupler of claim 9, wherein the base section of the stripline comprises a metal layer formed at the first main surface of the dielectric substrate, the metal layer comprising an opening formed at a center of the base section.

13. The hybrid coupler of claim 7, wherein the rectangular waveguide transition comprises a plurality of double-ridged waveguide transition sections, each double-ridged waveguide transition section of the plurality of double-ridged waveguide transition sections are attached to a respective port of the input port and the two output ports of the stripline.

* * * * *